United States Patent
Weis et al.

(10) Patent No.: US 12,049,944 B2
(45) Date of Patent: Jul. 30, 2024

(54) PLANETARY ROLLER SCREW DRIVE

(71) Applicant: Schaeffler Technologies AG & Co. KG, Herzogenaurach (DE)

(72) Inventors: Sebastian Weis, Brücken (DE); Waldemar Heier, Homburg (DE); Peter Keller, Bruchmühlbach-Miesau (DE); Mario Arnold, Aurachtal (DE); Silvia Kutzberger, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 46 days.

(21) Appl. No.: 17/761,612

(22) PCT Filed: Aug. 11, 2020

(86) PCT No.: PCT/DE2020/100697
§ 371 (c)(1),
(2) Date: Mar. 18, 2022

(87) PCT Pub. No.: WO2021/052526
PCT Pub. Date: Mar. 25, 2021

(65) Prior Publication Data
US 2022/0373066 A1    Nov. 24, 2022

(30) Foreign Application Priority Data
Sep. 20, 2019 (DE) ............ 10 2019 125 323.3

(51) Int. Cl.
*F16H 25/20* (2006.01)
*F16H 25/22* (2006.01)

(52) U.S. Cl.
CPC ................ *F16H 25/2252* (2013.01)

(58) Field of Classification Search
CPC ...... F16H 25/2252; F16H 25/22; F16H 13/04; F16H 13/08; F16H 2025/066; F16H 25/0047
See application file for complete search history.

(56) References Cited

U.S. PATENT DOCUMENTS

2013/0143711 A1   6/2013  Rudy
2016/0348775 A1*  12/2016 Schumann .......... F16H 25/2252
(Continued)

FOREIGN PATENT DOCUMENTS

CN    103109104 A    5/2013
CN    109563915 A    4/2019
(Continued)

*Primary Examiner* — Zakaria Elahmadi

(57) ABSTRACT

The disclosure relates to a planetary roller screw drive comprising a threaded spindle nut, a horizontal threaded spindle, a plurality of planetary rolling elements having a planetary rolling element profile, and at least two planetary guide rings. The threaded spindle is arranged concentrically in the planetary guide rings and the spindle nut. The planetary guide rings can be rotated relative to the threaded spindle and the planetary rolling elements are mounted so as to be rotatable about their associated planetary rolling element axis in the planetary guide rings and inside the spindle nut. The planetary rolling element profile of the planetary rolling elements meshes with the threaded spindle. The planetary guide rings are connected to a housing case for conjoint rotation, and the housing case has a housing case lateral surface on which a toothing is formed for coupling in a geared manner to with a continuous traction mechanism.

18 Claims, 1 Drawing Sheet

(56) References Cited

U.S. PATENT DOCUMENTS

2019/0118854 A1    4/2019  Tate et al.
2021/0269085 A1*   9/2021  Wuebbolt-Gorbatenko ................
                                                F16H 25/2006

FOREIGN PATENT DOCUMENTS

| | | | |
|---|---|---|---|
| DE |      277308   A       | 3/1990 | |
| DE | 102011014932 A1 * | 10/2011 | ............ F03C 1/0605 |
| DE | 102016222149 A1 | 5/2017 | |
| DE | 102017112710 A1 | 12/2018 | |
| DE | 102018116867 A1 | 1/2020 | |
| DE | 102019103383 A1 | 8/2020 | |
| DE | 102019103385 A1 | 8/2020 | |
| DE | 102019125312 A1 | 3/2021 | |
| WO | WO-2019007457 A1 * | 1/2019 | ......... F16H 25/2006 |
| WO |    2020164655 A1 | 8/2020 | |

\* cited by examiner

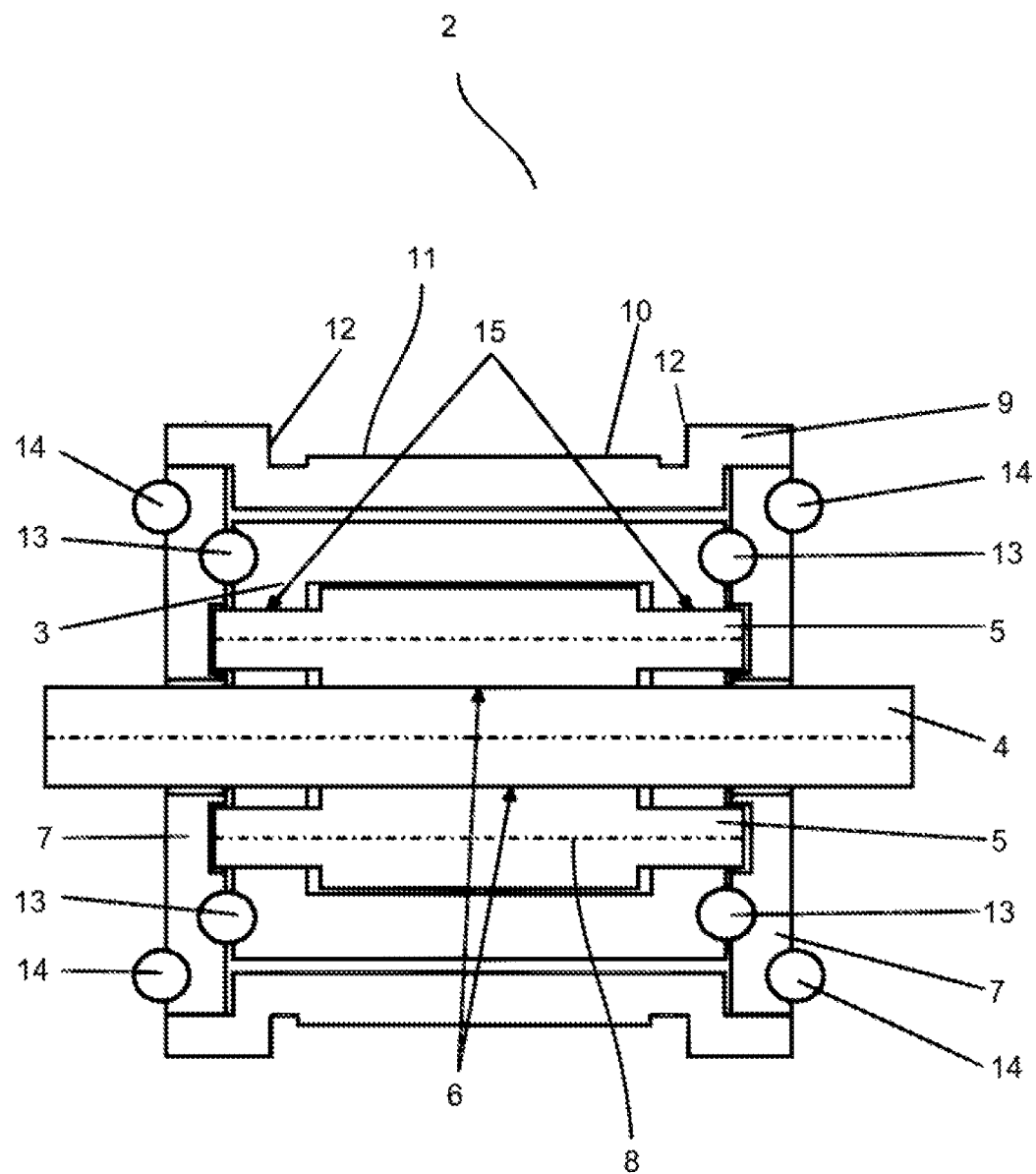

PLANETARY ROLLER SCREW DRIVE

CROSS-REFERENCE TO RELATED APPLICATIONS

This application is the U.S. National Phase of PCT Application No. PCT/DE2020/100697 filed on Aug. 11, 2020, which claims priority to DE 2019 125 323.3 filed on Sep. 20, 2019, the entire disclosures of which are incorporated by reference herein.

TECHNICAL FIELD

The disclosure relates to a planetary roller screw drive.

BACKGROUND

Planetary roller screw drives have been state of the art for many years and are described, for example, in DD 0277308 A5. There is a continuing need to manufacture planetary roller screw drives in a compact and cost-effective manner.

In light of the previously known background of the art, it is thus the task of the object of the disclosure to provide a particularly compact and easy-to-manufacture planetary roller screw drive.

SUMMARY

This object is solved by a planetary roller screw drive, comprising a threaded spindle nut, a horizontal threaded spindle, a plurality of planetary rolling elements having a planetary rolling element profile, and at least two planetary guide rings. The planetary roller screw drive converts a rotational movement into a translational movement. The horizontal threaded spindle is arranged concentrically in the planetary guide rings and the threaded spindle nut. The planetary guide ring can be rotated relative to the horizontal threaded spindle and the planetary rolling elements are mounted so as to be rotatable about their associated planetary rolling element axis in the planetary guide rings and inside the threaded spindle nut. The planetary rolling element profile of the planetary rolling elements meshes with the horizontal threaded spindle so that rotation of the horizontal threaded spindle causes the planetary rolling elements to rotate about their planetary rolling element axis and the horizontal threaded spindle. The planetary guide rings are connected to a housing case for conjoint rotation, and the housing case has a housing case lateral surface on which a toothing is formed for coupling in a geared manner, in particular with a continuous traction mechanism.

This offers the advantage that a particularly compact and space-optimized planetary roller screw drive can be provided. Furthermore, the planetary roller screw drive according to the disclosure can be manufactured in a simple and inexpensive manner. The housing case can also reduce or prevent the ingress of dirt into the geared part of the planetary roller screw drive. The connection for conjoint rotation of the housing case with the planetary guide rings can be a force-fitting and/or form-fitting and/or material-fitting connection.

First, the individual elements of the claimed subject matter of the disclosure are explained in the order in which they are named in the set of claims and particularly example embodiments of the subject matter of the disclosure are described below.

Planetary roller screw drives convert a rotational movement into a translational movement (and vice versa). The main components of a planetary roller screw drive are usually a horizontal threaded spindle, a threaded spindle nut, planetary rolling elements, and planetary guide rings. The planetary rolling elements with a planetary rolling element thread are held in a threaded spindle nut with two planetary guide rings and rotate in a planetary manner around the horizontal threaded spindle in an axis-parallel manner and without axial displacement. The threaded spindle nut moves linearly with respect to the horizontal threaded spindle. Both the horizontal threaded spindle and the threaded spindle nut can have a multi-grooved identical profile with a flank angle of 90°.

In principle, a planetary roller screw drive can be driven via the horizontal threaded spindle or via the threaded spindle nut.

The threaded spindle nut with a hollow cylindrical design has the function to receive the horizontal threaded spindle as well as the planetary rolling elements. The threaded spindle and the threaded spindle nut are mounted to be rotatable relative to one another. The threaded spindle nut also has the function of protecting the friction drive inside it from mechanical influences, as well as dust and other types of contamination.

Another function of the threaded spindle nut can also be to allow mechanical coupling to an actuator drive, in particular an electric motor actuator or hydraulic actuator.

To improve stiffness and positioning accuracy under load, a planetary roller screw drive can be preloaded. This can be achieved, for example, by designing the spindle nut in two parts and clamping the two threaded spindle nut halves against one another.

Furthermore, a threaded spindle nut can also have the function of setting the planetary roller screw drive without backlash. For this purpose, a threaded spindle nut spacer ring of matched thickness is located between the two spindle nut halves.

The threaded spindle nut can be of a single-part or two-part design, wherein in the latter case the threaded spindle nut comprises a first spindle nut half and a second spindle nut half. In an example embodiment, the first spindle nut half and the second spindle nut half are designed to be substantially identical.

The planetary rolling element has at least one profile on its outer circumferential surface. This profiling of the planetary rolling element can be designed as a planetary rolling element thread in the case of a planetary roller screw drive. Planetary rolling elements can have a cylindrical spatial shape, wherein the length of the planetary rolling element is greater than the diameter of the planetary rolling element. A cylindrical planetary rolling element has a planetary rolling element axis, which can also be referred to as the axis of rotation of the planetary rolling element. In an example embodiment, the planetary rolling elements are designed to be substantially identical.

The planetary rolling elements can have planetary rolling element bearing elements at both ends for positioning and mounting a planetary rolling element in or on a planetary guide ring so as to be rotatable. The planetary rolling element bearing elements can be designed in particular as bearing journals mounted in corresponding bearing bores of the planetary guide rings.

A planetary roller screw drive usually has at least two planetary guide rings, which have the function of fixing the radial position of the planetary rolling elements relative to one another within the spindle nut and of mounting the planetary rolling elements so that they can rotate about their longitudinal axis.

In addition to the mounting and positioning of the planetary rolling elements, the planetary rolling element guide ring, in particular, also prevents the penetration of coarse dirt into the spindle nut.

For this purpose, a planetary guide ring has, in particular, bearing points at or in which complementary bearing elements of the planetary rolling elements are received so as to be rotatable. In an example embodiment the bearing points of a planetary guide ring are formed as bearing bores and the bearing elements of the planetary rolling elements are formed as bearing journals complementary thereto so that the bearing journals are received in the bearing bores so as to be rotatable. The bearing points can be arranged equidistantly along the circumference of the planetary guide ring so that the planetary rolling elements are evenly distributed between the spindle nut and the spindle.

A planetary guide ring can be designed integrally with the spindle nut or as a component separate from the spindle nut. If the planetary guide ring is designed as a separate component from the spindle nut, the planetary guide ring can be formed from a metallic material, ceramic material or a type of plastic. In an example embodiment, the planetary guide rings are designed to be substantially identical.

In an example embodiment, it can be provided that the toothing is arranged axially between the two housing case rims.

According to an example embodiment of the disclosure, it can be advantageous for the housing case to have a housing case lateral surface on which a toothing is formed for coupling in a geared manner, in particular with a continuous traction mechanism. It can thus be advantageously achieved that a particularly simple connection of a torque-transmitting component, such as a continuous traction mechanism or a gear wheel, to the planetary roller screw drive can be realized, which contributes to further optimization of the installation space.

It can also be advantageous for the housing case lateral surface to be formed on the housing case radially offset in the direction of the horizontal threaded spindle, so that two housing case rims are formed on the housing case for guidance purposes, in particular of a continuous traction mechanism. The advantage of this embodiment is that an axial guide for a torque-transmitting component can be provided that is integrated into the planetary roller screw drive.

In a further development of the disclosure, the planetary guide rings and the threaded spindle nut can be arranged to be rotatable relative to one another via a first group of rolling bearings. In this way, it is possible to achieve a particularly low-friction rotation of the components relative to one another.

Furthermore, it can be advantageous for the planetary guide rings to have a second group of rolling bearings on their respective end faces. The effect made possible by this design of the object of the disclosure is that a particularly low-friction connection of the planetary roller screw drive can be achieved in the assembly situation.

According to a further advantageous embodiment of the disclosure, the planetary rolling elements can each have, at their distal ends, a planetary rolling element bearing journal, which is coupled in a geared manner to the threaded spindle nut. According to this combination of features, the advantage can be realized that a particularly compact design of the planetary roller screw drive is made possible.

According to an example embodiment of the disclosure, it can be advantageous that the housing case is made of plastic. This allows a design that is optimized both in regard to cost and weight of the housing case to be provided.

The disclosure will be explained in more detail below with reference to figures without restricting the general concept of the disclosure. The figures are only schematic in nature and serve only for understanding the disclosure. The same elements are provided with the same reference signs. The different features of the various exemplary embodiments can also be freely combined with one another as technically feasible.

BRIEF DESCRIPTION OF THE DRAWINGS

In the figures:

FIG. 1 shows an embodiment of the planetary roller screw drive according to the disclosure in a schematic cross-sectional view.

DETAILED DESCRIPTION

FIG. 1 shows a planetary roller screw drive 2. The planetary roller screw drive 2 has a threaded spindle nut 3, a horizontal threaded spindle 4, a plurality of planetary rolling elements 5 with a planetary rolling element profile 6, and the two planetary guide rings 7.

By means of the planetary roller screw drive 2, a rotational movement is converted into a translational movement. This is explained in more detail below. The horizontal threaded spindle 4 is concentrically arranged in the planetary guide rings 7 and the threaded spindle nut 3. The planetary guide rings 7 are rotatable relative to the horizontal threaded spindle 4 and the planetary rolling elements 5 are mounted so as to be rotatable about their respective planetary rolling element axis 8 in the planetary guide rings 7 and within the threaded spindle nut 3. The planetary rolling element profile 6 of the planetary rolling elements 5 meshes with the horizontal threaded spindle 4 so that rotation of the horizontal threaded spindle 4 causes rotation of the planetary rolling elements 5 about their planetary rolling element axis 8 and rotation of the planetary rolling elements 5 about the horizontal threaded spindle 4.

The planetary rolling elements 5 each have a planetary rolling element bearing journal 15 at their distal ends, which is coupled in a geared manner to the threaded spindle nut 3, for example by means of a suitable corresponding profiling such as an internal thread/external thread combination. As a result, the planetary rolling elements are coupled in a geared manner to both the horizontal threaded spindle 4 and the threaded spindle nut 3.

The planetary guide rings 7 have a larger diameter than the threaded spindle nut 3 and are connected for conjoint rotation with the housing case 9 so that the threaded spindle nut 3 is received within the housing case 9. The housing case 9 has a housing case lateral surface 10 on which the toothing 11 is designed for coupling in a geared manner, in particular with a continuous traction mechanism not shown. FIG. 1 also shows that the housing case lateral surface 10 is formed on the housing case 9 offset radially in the direction of the horizontal threaded spindle 4, so that two housing case rims 12 are formed on the housing case 9 for axial guidance purposes, for example of the continuous traction mechanism not shown.

The planetary guide rings 7 have unspecified receptacles for the planetary rolling element bearing journals 15, whereby it is achieved that the planetary rolling elements 5 rotate around the horizontal threaded spindle 4 when the planetary guide rings 7 are rotated. Since the planetary guide rings 7 are connected for conjoint rotation via the housing case 9, the planetary guide rings 7 rotate in synchronization with one another.

The planetary guide rings 7 and the threaded spindle nut 3 are arranged to rotate relative to one another via a first group of rolling bearings 13. The planetary guide rings 7 have a second group of rolling bearings 14 on their respective end faces. On the one hand, these bearing arrangements support the axial forces of the horizontal threaded spindle 4 and the radial forces by means of a belt drive or a gear wheel, for example. The axial force on the planetary guide rings 7 is absorbed by the second group of rolling bearings 14, which also ensure contact with the surrounding structure. In this way, the axial and radial forces can be absorbed and transmitted to the surrounding structure, the planetary roller screw drive 2 remains rotatable and the radial forces do not affect the horizontal threaded spindle 4 and the planetary rolling elements 5.

The planetary roller screw drive 2 can be used in particular for rear axle steering in motor vehicles.

The disclosure is not limited to the embodiments shown in the figures. The above description is therefore not to be regarded as restrictive, but rather as explanatory. The following claims are to be understood as meaning that a named feature is present in at least one embodiment of the disclosure. This does not exclude the presence of further features. If the patent claims and the above description define "first" and "second" features, this designation serves to distinguish between two features of the same type without defining an order of precedence.

LIST OF REFERENCE SYMBOLS

2 Planetary roller screw drive
3 Threaded spindle nut
4 Horizontal threaded spindle
5 Planetary rolling elements
6 Planetary rolling element profile
7 Planetary guide rings
8 Planetary rolling element axis
9 Housing case
10 Housing case lateral surface
11 Toothing
12 Housing case rim
13 First group of rolling bearings
14 Second group of rolling bearings
15 Planetary rolling element bearing journal

The invention claimed is:

1. A planetary roller screw drive configured to convert rotational movement to translational movement, the planetary roller screw drive comprising:
   a threaded spindle nut,
   a horizontal threaded spindle,
   a plurality of planetary rolling elements having a planetary rolling element thread configured to mesh with the horizontal threaded spindle, and
   two planetary guide rings rotatable relative to the horizontal threaded spindle, and the horizontal threaded spindle arranged concentrically within the two planetary guide rings and the threaded spindle nut, and
   each of the plurality of planetary rolling elements mounted so as to be rotatable about a corresponding one of a planetary rolling element axis within the two planetary guide rings, and
   rotation of the two planetary guide rings causes the plurality of planetary rolling elements to rotate about: i) the planetary rolling element axes and, ii) the horizontal threaded spindle,
   wherein the two planetary guide rings are fixed to a housing case for conjoint rotation therewith, and the housing case comprises:
   a housing case lateral surface formed with toothing configured to directly engage with and receive torque from a belt or gear wheel to rotate the housing case so as to provide the rotational movement of the planetary roller screw drive; and
   two housing case rims extending radially outwardly from the housing case lateral surface, the two housing case rims configured to provide axial guidance for the belt or gear wheel; and each one of the two planetary guide rings is fixed directly to a corresponding one of the two housing case rims.

2. The planetary roller screw drive of claim 1, wherein the two planetary guide rings and the threaded spindle nut are configured to be rotatable relative to one another via a first rolling bearing arranged axially between each one of the two planetary guide rings and the threaded spindle nut.

3. The planetary roller screw drive of claim 2, further comprising a second rolling bearing arranged on an end face of each one of the two planetary guide rings.

4. The planetary roller screw drive of claim 1, wherein each of the plurality of planetary rolling elements have, at each distal end, a planetary rolling element bearing journal configured to couple each of the plurality of planetary rolling elements to the threaded spindle nut.

5. The planetary roller screw drive of claim 1, wherein the housing case is constructed from plastic.

6. The planetary roller screw drive of claim 4, wherein each of the planetary rolling element bearing journals is received by a corresponding bearing bore arranged within each of the two planetary guide rings.

7. The planetary roller screw drive of claim 1, wherein the planetary guide rings are fixed to the housing case via a press fit in a radial direction.

8. The planetary roller screw drive of claim 1, wherein the two housing case rims are formed integrally with the housing case lateral surface.

9. The planetary roller screw drive of claim 1, wherein the two planetary guide rings extend radially outwardly of the threaded spindle nut.

10. A planetary roller screw drive configured to convert rotational movement to translational movement, the planetary roller screw drive comprising:
    a threaded spindle nut,
    a threaded spindle extending through the threaded spindle nut,
    two planetary guide rings rotatable relative to the threaded spindle and the threaded spindle nut,
    a plurality of threaded planetary rolling elements mounted within the two planetary guide rings and configured to mesh with the threaded spindle, each of the plurality of threaded planetary rolling elements configured to rotate about a corresponding one of a planetary rolling element axis, and
    a housing case having:
    a first end with a first rim, the first rim fixed directly to one of the two planetary guide rings for conjoint rotation therewith,
    a second end with a second rim, the second rim fixed directly to a remaining one of the two planetary guide rings for conjoint rotation therewith, a lateral surface configured to receive torque from a torque-transmitting component to provide the rotational movement of the planetary roller screw drive, the lateral surface:
integrally formed with the first rim and the second rim, arranged between the first rim and the second rim in an axial direction, and
the first rim and the second rim protruding radially outwardly from the lateral surface, and
rotation of the two planetary guide rings causes the plurality of planetary threaded rolling elements to rotate about: i) the planetary rolling element axes, and ii) the threaded spindle.

11. The planetary roller screw drive of claim 10, wherein the two planetary guide rings are rotatable relative to the threaded spindle via a first group of rolling bearings.

12. The planetary roller screw drive of claim 11, wherein the first group of rolling bearings is arranged between the threaded spindle nut and the two planetary guide rings in the axial direction.

13. The planetary roller screw drive of claim 12, further comprising a second group of rolling bearings arranged on an end face of each one of the two planetary guide rings.

14. The planetary roller screw drive of claim 10, wherein the two planetary guide rings have a larger outer diameter than the threaded spindle nut.

15. The planetary roller screw drive of claim 10, wherein the two planetary guide rings include bearing bores configured to receive the plurality of threaded planetary rolling elements, and the plurality of threaded planetary rolling elements are rotatable relative to the bearing bores.

16. The planetary roller screw drive of claim 10, wherein the first rim and the second rim are configured to provide axial guidance of the torque-transmitting component.

17. The planetary roller screw drive of claim 16, wherein the lateral surface is formed with toothing configured to directly engage with the torque-transmitting component.

18. The planetary roller screw drive of claim 17, wherein the toothing is configured to engage with a belt of a belt drive.

* * * * *